(12) United States Patent
Wieland et al.

(10) Patent No.: US 7,249,211 B2
(45) Date of Patent: Jul. 24, 2007

(54) SYSTEM AND METHOD FOR INTERRUPT HANDLING

(75) Inventors: Peter W. Wieland, Seattle, WA (US); Adrian J. Oney, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/558,997

(22) Filed: Nov. 13, 2006

(65) Prior Publication Data

US 2007/0088890 A1    Apr. 19, 2007

Related U.S. Application Data

(63) Continuation of application No. 10/985,360, filed on Nov. 10, 2004, now Pat. No. 7,149,832.

(51) Int. Cl.
*G06F 13/00* (2006.01)

(52) U.S. Cl. .................. 710/269; 719/318; 719/321

(58) Field of Classification Search ............... 710/22, 710/264, 1, 3; 709/213; 719/321; 707/103 R; 370/360
See application file for complete search history.

(56) References Cited

U.S. PATENT DOCUMENTS

| | | | |
|---|---|---|---|
| 6,212,574 B1 | 4/2001 | O'Rourke et al. | |
| 6,240,531 B1 | 5/2001 | Spilo et al. | |
| 6,732,138 B1 | 5/2004 | Browning et al. | |
| 6,785,894 B1 | 8/2004 | Ruberg | |
| 6,886,112 B2 | 4/2005 | Smith | |
| 6,895,553 B2 | 5/2005 | Wiley et al. | |
| 6,895,588 B1* | 5/2005 | Ruberg | 719/321 |
| 6,961,930 B1 | 11/2005 | Waldspurger et al. | |
| 7,010,546 B1* | 3/2006 | Kolawa et al. | 707/103 R |
| 7,058,786 B1 | 6/2006 | Oliveri | |
| 7,065,633 B1 | 6/2006 | Yates et al. | |
| 2003/0120836 A1* | 6/2003 | Gordon | 710/22 |
| 2004/0128569 A1 | 7/2004 | Wyatt et al. | |
| 2004/0190502 A1* | 9/2004 | Sharma | 370/360 |
| 2005/0102680 A1 | 5/2005 | Pettigrew | |
| 2005/0216895 A1 | 9/2005 | Tran | |
| 2005/0246453 A1* | 11/2005 | Erlingsson et al. | 710/1 |
| 2005/0246718 A1 | 11/2005 | Erlingsson et al. | |
| 2006/0075146 A1* | 4/2006 | Schoinas et al. | 710/3 |
| 2007/0033260 A1* | 2/2007 | Grouzdev et al. | 709/213 |

OTHER PUBLICATIONS

Michael M. Swift, Brian N. Bershad and Henry M. Levy, "Improving the Reliability of Commodity Operating Systems," Feb. 2005, ACM Transactions on Computer Systems, vol. 23, No. 1, pp. 77-110.

* cited by examiner

*Primary Examiner*—Christopher E. Lee
(74) *Attorney, Agent, or Firm*—Amin, Turocy & Calvin, LLP

(57) ABSTRACT

A system, methodology and/or computer architecture that facilitates processing device interrupts (including level-triggered interrupts) in a user-mode process is provided. The kernel interrupt handler can cause a dedicated thread in the process to wake and invoke the driver interrupt service routine. This thread can then return control to the kernel interrupt handler. In addition to processing interrupts in an isolated mode, the context switching technique could be used in any isolated environment to process interrupts via dedicated execution context methods.

20 Claims, 8 Drawing Sheets

SYSTEM AND METHOD FOR INTERRUPT HANDLING

CROSS REFERENCE TO RELATED APPLICATIONS

This application is a continuation of U.S. patent application Ser. No. 10/985,360, filed on Nov. 10, 2004 now U.S. Pat. No. 7,149,832, entitled "SYSTEM AND METHOD FOR INTERRUPT HANDLING", the entirety of which is incorporated herein by reference.

TECHNICAL FIELD

This invention is related to computer systems and more particularly to a system and/or methodology to handle interrupts in a driver isolation environment.

BACKGROUND OF THE INVENTION

Conventionally, devices were polled to determine a particular state. Today, however (in lieu of polling) interrupts are widely employed for hardware devices to notify processor(s) that attention is needed. For example, an interrupt can convey state of a device such as, a request is complete or a configuration has changed (e.g., cord pulled out). Generally, once an interrupt occurs, an operating system analyzes the state of the device and performs an action in accordance with the interrupt—this is in lieu of polling the device.

Interrupts are asynchronous external events to the processor that can alter normal program flow. They usually require immediate attention from the processor. Interrupts are very important for high speed input/output (IO) processing because they free up resources. When an interrupt is detected, the system often interrupts all processing to attend to the interrupt. In accordance thereto, the system saves the state of the processor and instruction pointers on the stack. An interrupt dispatch table in memory can be accessed by the processor to identify a function that is to be called in response to a particular interrupt. For example, a function can clear the interrupt for a variety of reasons. The function can execute processes such as clearing the state of the interrupt, calling a driver function to check the state of a card and clearing, setting a bit, etc.

The interrupt call can perform a small amount of processing on the controller and then return to the processor by obtaining the state from the stack and resetting the system to a state prior to the interrupt. In other words, the code that was running prior to detection of an interrupt stops executing in order to permit the interrupt to perform a specific function and then restarts where it halted once the function is complete.

It will be appreciated that, if a driver crashes, the failure is recorded as a kernel level fault and the system crashes. If a crash or failure occurs, the system memory and processor memory can be corrupted. Therefore, designers have been seeking alternative schemes to take existing systems for drivers and have them run in a user mode process. Recent developments have been directed to the use of driver isolation methods. However, a problem in terms of handling driver isolation is that interrupts are typically entirely associated with the operating system kernel. In other words, traditionally, user mode processes do not see interrupts. Unfortunately, in a driver isolated environment, the drivers run in a user mode process which requires delivery of the interrupts thereto.

What is needed is a system and/or methodology to get these kernel level interrupts (which can have many restrictions associated therewith) to the drivers in a user mode process. This is particularly difficult because the drivers in a user mode process are expecting to run only when there are no interrupts in operation. In other words, an issue with isolating device drivers is how to make device interrupts available in the driver protection domain. Some types of interrupts can simply be deferred, but for others the operating system must invoke the driver to clear the interrupting condition before the machine can return to normal functioning. Accordingly, a substantial need exists for a system and/or methodology that facilitates delivering interrupts into a process-based protection domain. This delivery into the user mode process would permit isolated device drivers to be compatible with respect to a wider variety of hardware.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a system, methodology and/or computer architecture that facilitates processing device interrupts (including level-triggered interrupts) in a user-mode process. The kernel interrupt handler can cause a dedicated thread in the process to wake and invoke the driver interrupt service routine. This thread can then return control to the kernel interrupt handler. It will be appreciated that while the invention relates to processing an interrupt in user-mode, this technique could also be used in kernel mode of the isolated environment to process interrupts via dedicated threads. In other words, the novel thread switching techniques described in reference to the exemplary aspects described herein can be applied to both user and kernel mode processes within an isolated environment.

Inside the protection domain of an exemplary aspect is a library which can simulate the kernel's interfaces for the isolated driver. This library (e.g., interior kernel) can have a thread for each interrupt level (or for each connected interrupt) on each processor. This thread can arrange with the kernel to not run unless an interrupt occurs. An isolated driver registers its interrupt service routine (ISR) with the interior kernel, which causes a proxy driver running in the real kernel to register its own ISR for the interrupt.

It will be appreciated that the exemplary implementation utilizes the callout mechanisms employed by conventional OS environments (e.g., Windows-brand OS). In these environments, callouts can occur if the thread is waiting on a system call. The exemplary aspect can drive both the association to a dedicated interrupt thread for each processor (since each processor can take an interrupt independently) as well as a thread per-level per-processor since it can be particularly difficult to determine if the interrupt thread will be in a system call when another interrupt is received.

The Windows-brand OS maintains the address of the last system call trap frame for a thread. In an alternate aspect, the OS can keep the last address of any trap frame (e.g., including interrupt frames). Therefore, it will be appreciated that the driver isolation mechanism(s) can choose any interior thread on which to perform the callout. In this alternative aspect, it will be understood that the amount of remaining stack space can be addressed by switching to a dedicated user-mode stack. Although the dedicated thread aspects are described in detail herein, it is to be appreciated that alternative aspects can be implemented without departing from the scope of the novel functionality described herein.

When an interrupt occurs, the kernel can invoke the proxy driver ISR. This ISR determines the appropriate dedicated thread by checking the interrupt and the processor it occurred on. It then directs the kernel to context switch to the dedicated thread. The dedicated thread can transition back to user-mode and, from there, can invoke the device driver's ISR. When the real ISR returns, the thread returns to kernel-mode where it directs the kernel to switch back to the interrupted thread. The interrupted thread can determine if the interrupt was handled by a driver and, if not, can locate the next ISR to call which could also be a proxy ISR. Eventually the kernel interrupt handler completes and allows the interrupted thread to continue running. Since each processor in a system could be processing an interrupt at the same time it will be appreciated that it is particularly important to have at least one thread per processor.

Another aspect is directed to ensuring that the interrupt handling threads are not running unless they are processing an interrupt (or when they are starting up or terminating). Therefore, the invention can ensure the special type of wait they perform cannot end until an interrupt is dispatched to them or they are to terminate. Due to optimizations in operating systems (OS) (e.g., NT-brand OS) it may not be possible to call-out to user-mode more than once on a given thread. Therefore, another aspect of the subject invention ensures that attempts are not made to process two interrupts at once on the same thread. For this reason the invention can employ an interrupt thread per connected interrupt level on each processor. In other words, when an interrupt at priority N is active, only interrupts at N+1 or greater can occur and these will occur on different threads. However, if not for this OS optimization, the invention can use a single thread per processor. In aspects where the OS optimization is not an issue, the invention could simply avoid the "switch to dedicated thread" act as this would already be the location of operation.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Definitions

Figure 1:
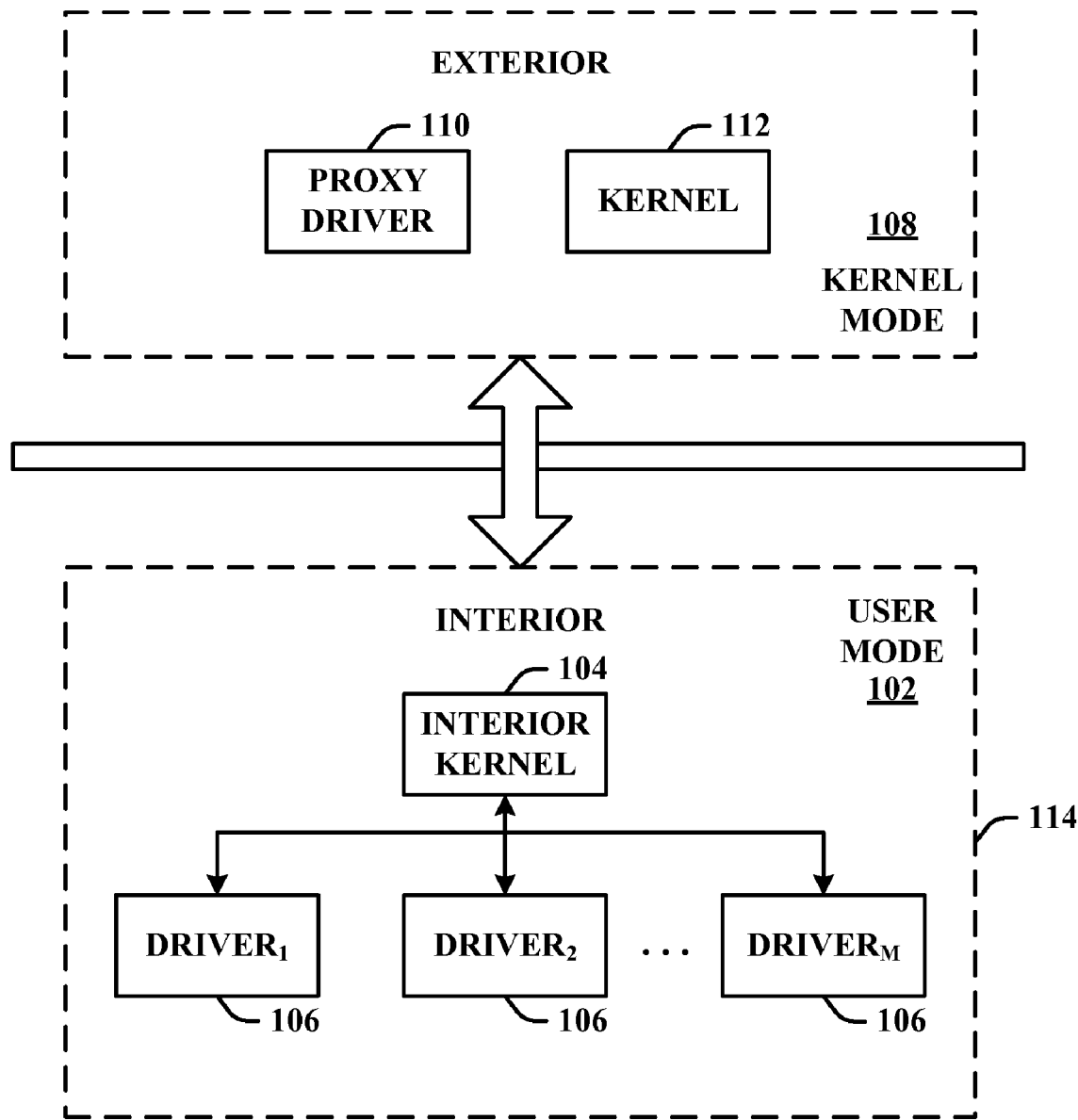
FIG. 1 illustrates a general component block diagram of a system that illustrates an isolation environment in accordance with an aspect of the subject invention.

The following terms are used throughout the description, the definitions of which are provided herein to assist in understanding various aspects of the subject invention. These definitions are not intended to limit the scope of the following detailed description.

"Capturing" refers to the process of making interior data available to the exterior in a safe and secure manner and ensuring that the data cannot be modified by the interior once the exterior has validated it.

"Client Process" refers to the process that initiated an operation that the system has directed into a Sandbox. It will be understood that the System Process can be a Client Process.

"Control Point" refers to a management application program interface for use by the operating system or by management tools. Control points can be used to create and destroy sandboxes, and to get or set information about them. Since control points are implemented by the sandbox manager and often take a handle to a sandbox object, the distinction between control points and entry points, which imply a transition to the interior, is to be understood.

"Entry Point" refers to a mechanism of transferring control from the sandbox exterior to the sandbox interior. Control will not return to the exterior until the code running on the interior returns or calls an exit point. The sandbox can implement Entry Points using a private message-passing scheme described below.

"Exit Point" refers to a mechanism of transferring control in a thread from the sandbox interior to the exterior. The exit point is akin to an operating system (OS) system call, which transitions a thread from user-mode to kernel-mode. The invention can employ Exit Points using both system calls and a private system-call table with a corresponding set of APIs exposed through it.

"Exterior" refers to the address space(s) outside of the sandbox. For the purposes of this document, the exterior is the kernel's address space. Code running on the exterior can access the sandbox interior using interfaces exposed by the sandbox and can enter the interior by going through one of the sandbox's "entry points"

"Exterior Agent" refers to the code that runs the exterior side of the sandbox. The invention can implement this as part of the OS kernel.

"Integrated Driver" refers to a driver that the system is running as part of the OS Kernel. This is the traditional Windows-brand driver model (WDM) method of running drivers.

"Interior" refers to the restricted address space implemented by the sandbox. This address space can be accessed from the "exterior" but code running in the interior cannot access anything on the "exterior" without going through one of the sandbox's "exit points."

"Interior Agent" refers to the code that runs the interior of the sandbox. The invention can implement this as a standard user-mode EXE.

"Isolated Driver" refers to a driver that the system is running separately from the OS Kernel. In effect, the OS is treating such a driver as an application—isolating it from other drivers and applications and the OS core to ensure that a fault in it cannot crash other components.

"Interior Kernel" refers to the system provided code running in the Interior which simulates the OS device driver interface (DDI) for the benefit of isolated drivers.

"Marshalling" refers to the process of transforming data in one-half of the Sandbox in preparation for its use by the other half. Since the Interior cannot directly access Exterior data, the Sandbox will need to make such data accessible in some way (e.g., by copying the data to an interior buffer, by mapping the pages into the interior safely). Determining what data the Sandbox needs to move and ensuring that the data is referentially valid is the process of marshalling. The question of how the isolation system moves that data is one of mechanism and mapping and not of marshalling.

"Proxy Object" refers to the exterior incarnation of a shadowed object. In many cases, the shadow object will be an IO Subsystem object (e.g., driver or device object).

"Sandbox" refers to an isolated environment in which to run an executable. Code running in the interior of the sandbox cannot access or modify any data on the exterior of the sandbox except through specific calls to the exterior of the protected space. User-mode would be an example of a sandboxed environment. Although the sandbox is not simply one entity it will often be referred to as such. In these cases, the term refers to the code specifically written to implement the sandbox behavior as well as existing kernel code which implements mechanisms on which the sandbox is dependant. For example, one may say that the sandbox has "entry points." These may not be part of the sandbox code but could instead be additional OS system calls that result in calls into the sandbox specific code. In this case, this document still refers to them as sandbox entry points.

"Shadowing" refers to the process of maintaining two copies of a data structure—one in the interior and one in the exterior and copying updates between them as necessary. Shadowing is similar to marshalling but implies a more dynamic relationship between the interior and exterior data than the "bundle it up and push it in" marshalling process. Additionally "shadowed" objects will generally have a longer lifespan than just the current procedure call. Shadowing is necessary to handle the cases where the Exterior needs to make persistent non-opaque exterior data structures available to and modifiable by the interior. A DEVICE_OBJECT structure is an example of this case—WDM drivers and the input/output (IO) system both access this persistent structure directly. A shadowed object actually consists of two separate data structures—the one in the interior is the "Shadow Object" while the one in the exterior is the "Proxy Object."

"Shadow Object" refers to the incarnation of a shadowed object that lives in the interior. The shadow object will usually have a handle to the proxy object as one of its attributes. The shadow object may not implement all of the fields that the proxy object does since some values may be opaque or simply meaningless within the interior.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The detailed description that follows includes a discussion of driver isolation generally. Accordingly, the detailed discussion includes specific examples of driver isolation and thread handling techniques. It is to be understood that the novel concepts and functionality discussed herein can be applied to any suitable device isolation environment without departing from the spirit and/or scope of the invention and corresponding claims appended hereto.

As will be discussed in greater detail infra, the driver isolation concepts can implement a method of processing device interrupts (including level-triggered interrupts) in a user-mode process. The kernel's interrupt handler can cause a dedicated thread in the process to wake and invoke the driver's interrupt service routine (ISR). This thread can then return control to the kernel's interrupt handler. While it is integral in the described aspects to process interrupts in user-mode, it is to be appreciated that the techniques of the subject invention can also be used in kernel mode to process interrupts on dedicated threads. It should be understood that the thread switching techniques described in connection with the subject invention are a new and non-obvious use of the existing kernel code. In other words, a particularly important distinction of isolation is that the isolated environment is separate from the kernel both in address space and privilege level. While the exemplary user-mode aspect is representative of a specific isolation technique, it will be appreciated that other aspects can exist without departing from the novel aspects described herein.

Referring now to FIG. 1, an architecture 100 that facilitates threaded interrupt handling in accordance with an aspect of the subject invention is shown. Generally, the architecture 100 includes a user mode 102 section having an interior kernel 104 and a device driver(s) 106. A kernel mode section 108 can include a proxy driver 110 and a kernel 112. Inside the protection domain 114 is an interior kernel 104 (e.g., library) that can simulate the kernel's 112 interfaces for the isolated driver 106. It will be appreciated that interior 114 can include M number of drivers (where M is an integer). Further, it is to be understood that the M drivers can be referred to individually or collectively as drivers 106. The interior kernel 104 can have a thread for each interrupt level (or for each connected interrupt) on each processor which arranges with the interior kernel 104 to not run unless an interrupt occurs using a new interface provided.

In operation, the isolated driver 106 registers its interrupt service routine (ISR) with the interior kernel 104. This registration prompts a proxy driver 110 running in the "real" kernel 112 to register its own ISR for the interrupt. When an interrupt occurs, the "real" kernel 112 can invoke the ISR of the proxy driver 110. This proxy driver 110 ISR can determine the appropriate dedicated thread by checking the interrupt and the corresponding processor. The ISR then directs the kernel 112 to context switch to the dedicated thread. The dedicated thread transitions from kernel mode 108 back to user-mode 102 and, from there, invokes the device driver's 106 ISR within the protection domain 102. When the real ISR (e.g., corresponding with the isolated driver 106 in the user mode 102) returns, the thread returns to kernel-mode 108 where it directs the kernel 112 to switch back to the interrupted thread. The interrupted thread determines if the interrupt was handled by a driver 106 and, if not, the interrupted thread locates the next ISR to call which could also be a proxy ISR. Eventually the kernel's interrupt handler completes and allows the interrupted thread to continue running.

Since each processor in a system could be processing an interrupt at the same time it is particularly useful to employ at least one thread per processor. The subject invention can ensure that interrupt handling threads are not running unless they are processing an interrupt (or when they are starting up or terminating). In doing so, aspects can ensure that the special type of wait they perform does not end until an interrupt is dispatched to them or they are to terminate. These waits will be described in greater detail infra.

With respect to the disclosed aspect, it will be appreciated that due to optimizations in computer OSs, it may not be possible to call-out to user-mode more than once on a given thread. Therefore, attempts are not made to process two interrupts at once on the same thread. Accordingly, an interrupt thread per connected interrupt level on each processor can be provided. In other words, when an interrupt at priority N is active, only interrupts at N+1 or greater can occur. Moreover, these interrupts can occur on different threads.

As presented supra, aspects of the subject invention are directed to a driver isolation model that can provide an isolated environment 100 in which an OS can run a subset of the existing device drivers without allowing them to corrupt the state of the kernel and crash the system. More particularly, various aspects of the invention are directed to a system and/or methodology of threaded interrupt handling with respect to these isolated environment(s).

In order to provide a simulated environment, the invention can provide a technique of allowing the isolated driver 106 to handle interrupts from the devices it controls while maintaining binary-compatible and isolation goals. The nature of the driver isolation (DI) technique of the invention can use a process and/or thread to simulate the OS environment thereby permitting interrupts to arrive on external threads.

The subject invention can provide an isolated driver 106 the ability to receive and dismiss interrupts in a protected space 114. Additionally, the invention can allow a small set of device driver interfaces (DDIs) to function while dispatching interrupts (e.g., interrupt request level (IRQL) transitions, deferred process control (DPC) queuing and/or cancellation) corresponding to a driver model DDIs available at DIRQL (the relatively restrictive IRQL range at which device interrupts arrive).

Figure 2:
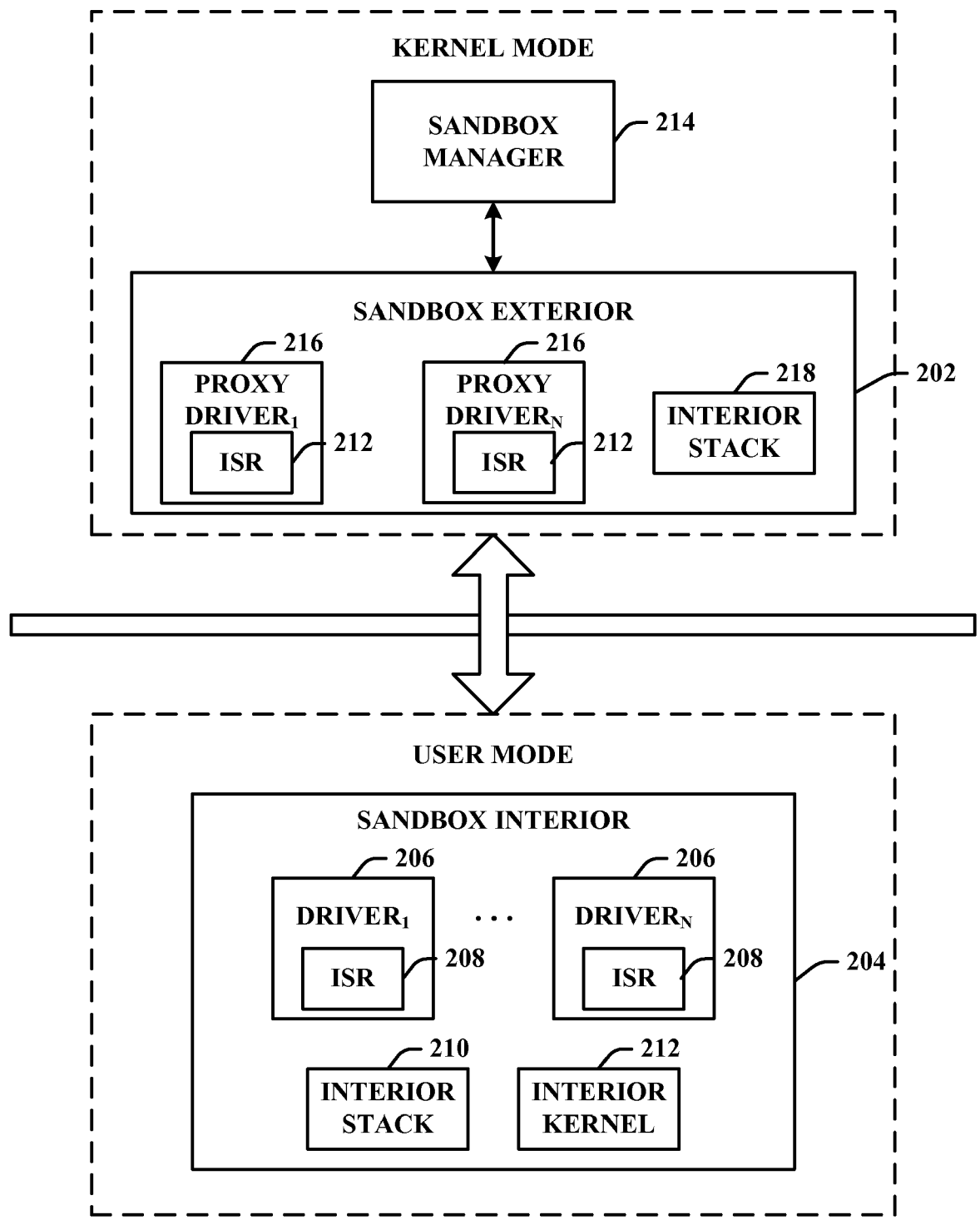
FIG. 2 illustrates a general architectural diagram that illustrates an exemplary protection environment having a sandbox interior and sandbox exterior in accordance with an aspect of the subject invention.

Referring now to FIG. 2, an interrupt model architecture 200 in accordance with an aspect of the subject invention facilitates handling interrupts in an isolated environment. The architecture 200 can provide features employed in terms of binary-compatibility and isolation. It will be appreciated that five basic actions of an integrated driver model in its interrupt service routine (ISR) can include: 1) confirm that its device signaled an interrupt; 2) save any volatile state associated with that interrupt; 3) start any new operation which might have been pending; 4) clear the interrupt condition; and 5) arrange for any deferred handling which may be required.

The exemplary architecture 200 is directed to an isolated call system that can allow the sandbox exterior 202 to cause the sandbox interior 204 to invoke the driver's 206 ISR 208 (similar to direct call) but within the isolated environment 200. This model can start by switching to the address space of the interior process 200 from the sandbox exterior 202 to the sandbox interior 204. It then selects a dedicated interior stack 210, copies the interrupt parameters to this stack 1210, transitions the thread to user-mode and calls a pre-registered interior function, which dispatches the appropriate ISR 208.

When the driver's 206 ISR 208 completes, the interior kernel 212 bundles the result and makes a system call which returns the thread to kernel-mode and allows it to continue. If desired, the exterior ISR 214 can then request a deferred procedure call (DPC) to allow the interior 204 to perform deferred processing, and returns a determination of whether the interior 204 handled the interrupt. It will be appreciated that the system can limit the amount of damage the thread can cause while in user-mode.

In order to provide context to the isolated call mechanism(s) of the subject invention, issues common to any interrupt handling model are discussed below. The following discussion is provided to contextualize the described aspects of the invention. To that end, the discussion that follows is not intended to limit the spirit and/or scope of the invention and claimed appended hereto.

Non-paged Memory

In order to call the isolated driver at DIRQL non-paged memory is provided to the interior in order to avoid any page faults. The DI techniques of the subject invention can support locking arbitrary interior regions. The interior kernel 212 can also lock all code pages when modules load, and provides support for locking interrupt thread stacks.

Emulating Device Driver Interfaces at DIRQL

As a driver 206 usually cannot access the majority of the driver model DDIs above dispatch level (the lowest level at which thread switching can be disallowed, immediately below DIRQL), the subset that the interior kernel 212 must simulate at DIRQL is small. Of this subset, only a few routines require the ability to exit the interior 204. These are primarily DDIs that query or change the interrupt level, or that manipulate interrupt locks.

To exit the interior 204 at a raised IRQL requires some changes to the system call handler. There can be debug checks that ensure that the system does not enter or leave a system call at raised IRQL. While these remain appropriate for most processes, a mechanism of identifying an interior process and disabling them only for that case is provided in accordance with aspects of the subject invention. Additionally, the system-call return path generally assumes to be called at passive level and may attempt additional work (e.g., asynchronous procedure calls (APCs) or signal delivery) that may be only appropriate at passive level and can be changed to check before performing this additional work.

Aspects of the subject invention can provide raise IRQL, lower IRQL and obtain current IRQL exit points to query and manipulate the current IRQL. Other aspects provide for acquiring interrupt lock and release interrupt lock, which allow the interior processes to synchronize between interrupts. The interior can simulate the driver model DDI using these latter two exit points. An alternate aspect can employ interfaces that the interior can invoke to raise interrupt level on a separate interrupt vector. This could allow a user to retain the IRQL level checks in the regular system call paths. However, a user could still need a modification to keep such calls from being a fatal system error in the event that an interior process makes them.

Locating Current Sandbox at DIRQL

In earlier systems, the sandbox exit points all used the interior process' handle to the sandbox object to locate the sandbox object, opening the well-known handle to find and reference it. While this method can work at passive level, at DIRQL the exterior 204 cannot access the process handle table to find the sandbox object. A similar issue exists for the exit points that take proxy interrupt handles as parameters at DIRQL. These routines cannot safely access the proxy handle table, but must have a safe way of resolving the proxy interrupt handle or identifying it as invalid.

The subject invention addresses the first issue by putting a direct sandbox object pointer at the tail of the EPROCESS structure. This allows the exterior to identify its interior process quickly. The exterior does not attempt to reference the sandbox object at raised IRQL, but the invention can avoid the implied race condition with object destruction by disconnecting and flushing interrupts early in rundown. This can ensure that a user is not in a raised IRQL path by the time the kernel destroys the sandbox object.

Additionally, the invention can address the latter problem specifically for interrupt proxy handles by having a per-sandbox list of connected interrupt proxies. When the interior invokes an exit point, the exterior searches this list for a proxy interrupt with a matching proxy handle.

DPC Processing at DIRQL

In addition to the DDIs that require exit points, some require the interior kernel 212 to synchronize DIRQL and passive level operations—namely requesting and canceling DPCs. The interior kernel 212 can implement a form of real spin lock which it can use to synchronize access to a special interrupt DPC queue.

The driver model DDI can determine which DPC queue it will work on. In exemplary aspects, the determination can be the one for its logical processor (if at passive level) or the interrupt DPC queue (if at DIRQL). In the latter case, the interior kernel 212 can set a global flag indicating there are interrupt DPCs to process. The current interrupt handler can check this flag on exit and return its value to the exterior. In response, the exterior 204 can request a DPC to set a pre-registered event, which a specific interior thread is waiting on. This thread can raise the current IRQL to synch level, acquires the real-lock for the queue, removes all the entries on the queue, drops the lock, returns to passive level, and then inserts each DPC into the logical processor DPC queues.

Rundown

The interior process closing its sandbox object handle triggers interior rundown. Unfortunately, during process termination, the operating system (OS) can destroy the process address space before closing the process handles.

To receive notification of termination quickly, the invention adds a direct callback between the OS process termination code and the sandbox manager 214. If the OS process termination code notices a sandbox pointer in the target process, it can call the exterior to notify it before attempting to terminate the interior threads. This not only allows the exterior to disconnect all interrupts before address space destruction, the exterior can also wake any threads dedicated to interrupt handling before OS attempts to terminate them.

Implementation

Direct Call

One aspect of interrupt handling is directed to a direct call mechanism. This model (e.g., NT-brand environment) for handling interrupts allowed focuses on issues involved with changing IRQL from a user-mode process, locking physical memory to allow DIRQL access, and structuring the interrupt connection model exposed to the interior 204.

Although procedurally functional, direct call can break isolation. Therefore, it can be considered somewhat unstable. Since the driver executes in ring-0, it has access to the kernel address space and could silently corrupt it. The kernel trap handlers also cannot detect that it is running in isolated code, as the handlers check the current processor mode to distinguish between a process-crashing user-mode exception and a system crashing kernel-mode one.

During initialization the interior kernel 212 performs two acts. First, it registers a single interrupt dispatch routine for any interrupt that occurs. Next, it locks any code not in a PAGE* section in the interior kernel 212 or any loaded module locked into memory. As other aspects discussed infra, the proxy driver 216 registers its own exterior ISR 212 when the isolated driver 206 attempts to connect an interrupt. In this aspect, the interrupt handler is very simple. It can first attach to the interior process using a new function, KeStackAttachInterruptProcess, which can switch the processor to the page tables for the interior address space 204. Once this is complete, the ISR 208 calls the interior's global interrupt handler, passing it the binding information for the object corresponding to the interrupt that occurred. The interior routine determines the correct driver ISR 208 to invoke and calls it directly. When the global handler returns, the proxy ISR 212 restores the original address space (with KeStackAttachInterruptProcess) and returns the interrupt result to the kernel. Because this aspect breaks isolation, an isolated call aspect was developed.

Isolated Call

The isolated call allows the exterior 202 to cause the interior 204 to invoke the driver's ISR 208 (similar to direct call) but within the isolated environment 200. This model starts as the direct call model does, by switching to the address space of the interior process. It then selects a dedicated interior stack, copies the interrupt parameters to this stack, transitions the thread to user-mode and calls a pre-registered interior function, which dispatches the ISR.

When the driver's ISR 208 completes, the interior bundles the result and makes a system call which returns the thread to kernel-mode and allows it to continue. The exterior ISR 212 can then request a DPC to allow the interior to perform deferred processing, and returns a determination whether the interior 204 handled the interrupt.

Isolated call aspect facilitates retaining the benefits of isolation while still dispatching interrupts to user-mode. The callout mechanism first writes a call-out frame to the kernel mode section of the stack. It next adjusts the kernel stack base to point to the blank region below the frame and builds a new system call frame. It then pushes the callout parameters onto the thread's user-mode stack and "returns" from the faked system call. Control passes to the fake system call's return address, which the kernel has set to a known callout handler in NTDLL. The callout handler invokes the registered callback routine and then makes a system call to return control to the system.

It will be appreciated that this aspect extends the direct call aspect with a modified form of callout. The interior can register a set of callout stacks with the exterior. When an interrupt occurs the proxy-ISR 212 can attach to the interior process just as with direct call. Next, the proxy-ISR 212 can write the callout frame to the kernel mode stack, move the stack base and write the fake system call frame but can use the stack address of the interior callout stack rather than the thread's actual user-mode stack (which would be invalid in the interior process).

As discussed supra, the subject invention is directed to a threaded interrupt handling technique to invoke isolated device drivers. The subject invention employs a driver isolation architecture that can manipulate a system for drivers to make them run in a user mode process in lieu of a kernel mode process. Aspects of the invention employ simulation techniques to mimic the driver model OS kernel while actually operating in a user mode process running on the system.

Referring again to FIG. 2, within the architecture 200 components located inside the "interior" 204 are not aware of anything outside of the "interior" boundary. Likewise, components outside of the "interior" boundary are described as being included within the "exterior" 202.

As discussed above, interrupts are a way for hardware devices to notify a processor that they need attention. For example, a device (not shown) can notify a processor in the event that a request is complete, a configuration has changed (e.g., cord pulled out), etc. Essentially, when an interrupt occurs, the system looks at the state of the device to perform the action in accordance with the interrupt. It will be appreciated that interrupts facilitate high speed IO processing because they free up resources unlike conventional polling methods.

In operation, when an interrupt is detected, the system literally interrupts the current code and/or processes. In accordance thereto, the system saves the state of the processor and instruction pointers on a stack. An interrupt dispatch table in memory can be accessed by the processor to identify what function and/or process is to be called in response to a particular interrupt. For example, a function can clear the interrupt for a variety of reasons. The function can execute processes such as clearing the state of the interrupt, calling a driver function to check the state of a card, clearing and/or setting a bit, etc.

It will be understood that the interrupt call can perform a small amount of processing on the controller and then return to the processor by pulling the state from the stack and resetting to the state prior to receipt of the interrupt. In other words, the code that was running stops to allow the interrupt to perform its function and then restarts where it left off.

One problem in terms of handling interrupts in a driver isolation environment (e.g., architecture 200) is that, traditionally, interrupts are entirely a handled by the OS kernel—e.g., user mode processes never saw them. However, in accordance with the subject invention, because operation and delivery of the interrupts is within the driver isolation environment (e.g., architecture 200) and the drivers are running in a user mode process therefore, interrupts are delivered into the same isolation space.

In one aspect, a vector in the dispatch table 218 located in the exterior can identify different level interrupts. For example, if a level 4 interrupt is running and a level 3 is received, the system can be programmed to ignore the lower level interrupt. Accordingly, if a level 6 comes in, the system can push the level 4 into the stack and save the state. Once the level 6 is complete, the system can regain the state from the stack and begin processing of the level 4. It will be appreciated that there can be any number of levels of interrupts defined (e.g., 32) in accordance with alternative aspects.

The interrupter controller can maintain this hierarchy of levels of interrupts. In accordance with the invention, the interrupt controller can be programmed to accept interrupts at a specific level. Therefore, the interrupt controller will not notify the processor of any interrupts below the pre-defined priority level. The interrupt controller can act as a buffer between the devices which may only report an interrupt once and the processor which can only process one interrupt at a time.

The difficulty to implement interrupts for an isolated driver model (e.g., Windows-brand driver model) is that the model gives drivers very low level control over interrupt handling. Therefore, in a driver model such as WDM an interrupt (e.g., NT-brand object) can be registered and given a call back that should be invoked if the system believes the interrupt occurred. In this environment, it is possible to have more than one device at the same interrupt level. Therefore, it may be necessary to call 4 or 5 driver interrupt routines if they all share the same interrupt level. It will be appreciated that this is very common in driver models.

In accordance with the subject invention, the interrupt priority can be encoded into the interrupt process. When a kernel level interrupt occurs, the system knows how to find the chain of interrupt objects for a certain level. As well, it walks thru them to find all of the service routines. Therefore, this chain of interrupts can be particularly hard to handle in an isolated environment.

Another problem is that the driver is limited to a few abilities at the interrupt level. It can raise its own interrupt level. Therefore, any kernel code can be called by the system to raise its interrupt level to N. As well, the system can dictate the interrupt to lower the level to its original level. Basically, the interrupt level can be raised or lowered as needed or desired. On a multiprocessor system, the interrupt level of a device can be raised—e.g., 4. In this situation, code on the processor will not be interrupted for interrupts lower than level 4. It will be appreciated that this situation is characteristic of a uni-processor system.

On a multiprocessor system, a particular level does not protect from an interrupt happening anywhere (e.g., another processor). By way of example, processor A might be set to level 4 whereas, Processor B is set to level 0—therefore, the level setting characteristic is not a synchronization mechanism. The drivers can always raise or lower their interrupt level. They can also synchronize with a particular interrupt level or call associated with a particular interrupt level.

Where the processor is raised up to the right interrupt level an interrupt lock associated with that interrupt level can be acquired. Therefore, if an interrupt comes in on B, the interrupt will not get serviced until the lock is released on A.

Yet another aspect is directed to delaying the call. For example, at interrupt level a DPC can be scheduled. DPCs run at dispatch level, which is lower than any DIRQL. In other words, the concept of a DPC is not to block hardware interrupts.

Designs Fundamentals

In the OS driver model, drivers operate directly on objects shared with the kernel. As such, when a driver crashes the system must treat the state of the kernel as irreparably compromised. To prevent further possible damage to user data (e.g., due to file system memory corruption) and possible security exploits, the system takes itself offline.

By contrast, user mode applications access the kernel via handles. These handles form a layer of managed indirection between the application and the objects it accesses through the system application program interface (API). The handle tables are stored in kernel mode and conversion between handles and objects forms a choke point for security and object lifetime management. Thus, when an application crashes the system is both isolated from the damage and able to clean up afterwards.

Much of the sandbox design of the subject application consists of silently converting driver calls from a kernel mode model to a user-mode application model. The overall effort can be broadly broken into the following categories:

1) The reimplementation of kernel functionality in user mode.

2) Silently converting pointer based functions to handle based functions and visa versa.

3) Transferring control of operation back and forth across the interior/exterior boundary.

4) Marshalling & validating data across the boundary during those control transfers.

Architecture

Figure 3:
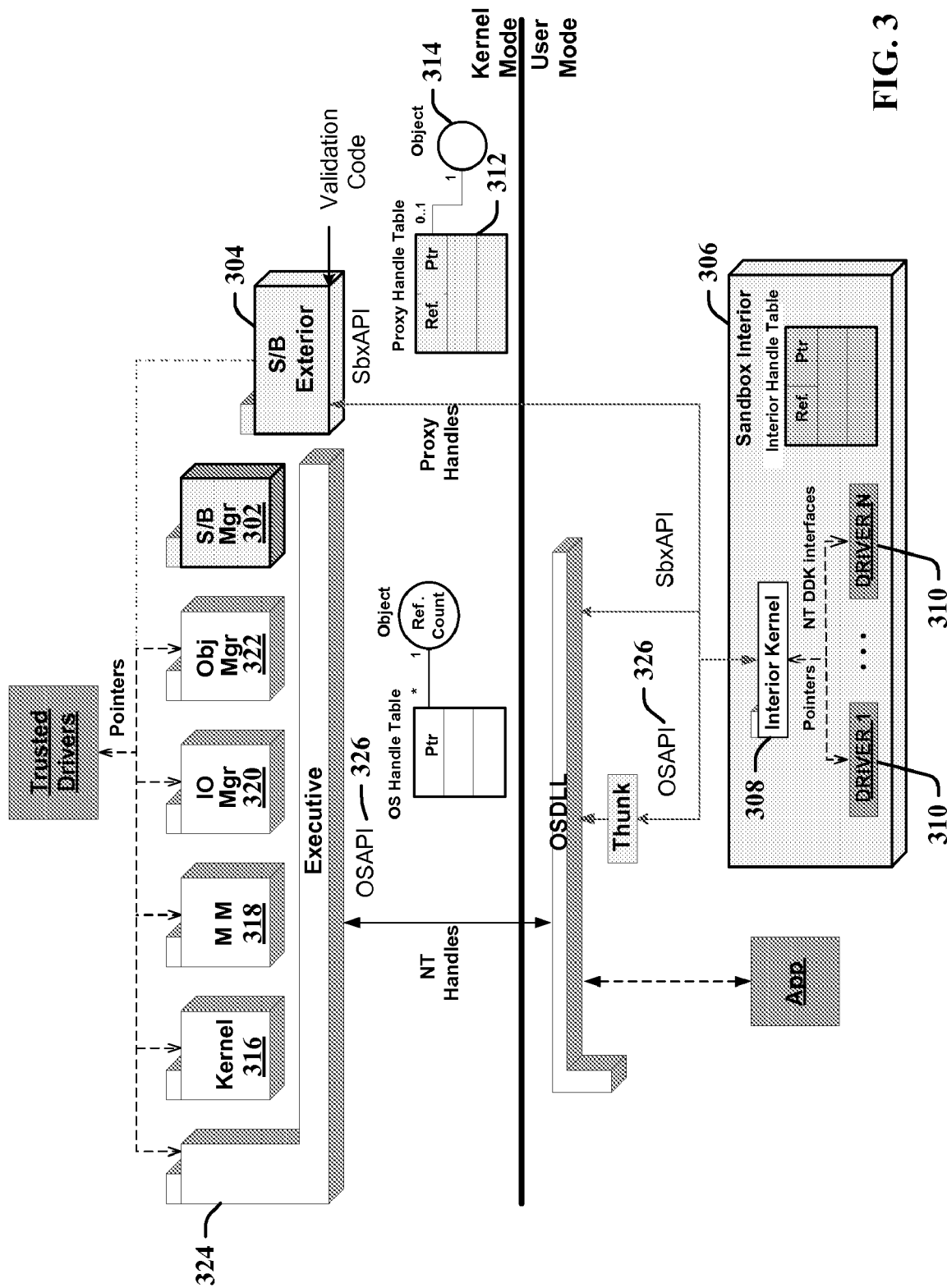
FIG. 3 illustrates an exemplary architectural diagram that facilitates delivering interrupt threads between a kernel mode and a user mode in accordance with an aspect of the subject invention.

Referring now to FIG. 3, the architecture 300 generally includes four components: the Sandbox Manager (SBM) 302, the Sandbox Exterior (SBE) 304, the Sandbox Interior (SBI) 306 and the Interior Kernel (SBK) 308. The SBM 102 is a component of the OS kernel that manages the lifespan of all sandboxes. This includes not only creating and terminating sandboxes but a small set of "control" operations used to cause the sandbox to perform operations.

In one aspect, when the SBM 302 creates a sandbox it allocates a reference-counted OS object called a Sandbox-Object. This object represents the isolated environment as a whole (both the SBI 306 and SBE 304) and is the point of reference for all of the control and termination APIs. The lifespan of this object controls the lifespan of the SBI 306 and SBE 304. When deleting the object, it is to be understood that the SBM 302 has already destroyed the SBI 306 and SBE 304.

The SBE 304 is the trusted side of the sandbox environment. It implements the exit points that the SBI 306 uses, provides services for shadowing objects and marshalling data to the SBI 306 and back. To the IO system, the SBE 304 appears to be a loaded driver and is the owner or receiver of all IO related objects associated with an isolated component (e.g., driver, device, file, IRPs, MDLs). To other drivers the SBE 304 is responsible for ensuring that data returned is consistent with that of a properly functioning driver of the appropriate class. A more detailed description of this functionality is discussed infra.

The SBI 306 is the un-trusted side of the sandbox. This is where the driver(s) loads and executes. The SBI 306 is isolated from the rest of the OS such that the drivers loaded inside cannot access kernel services or memory without going through the designated exit points. The SBI 306 is responsible for implementing the various required entry points to ensure that the SBE 304 has some way of communicating with components (e.g., drivers) inside the isolated environment.

The SBK 308 provides runtime support for drivers running in the SBI 306. This binary provides support for some subset of the DDIs normally provided by the kernel. It is responsible for setting up the interior side of the entry and exit point mechanisms, loading driver images and ensuring their imports are satisfied, and generally providing any functionality on which a driver 310 or the SBE 304 is dependant. As illustrated in FIG. 3, the SBI 306 can include 1 to N drivers, where N is an integer. It is to be understood that drivers 1 to N can be referred to individually or collectively as drivers 310.

The SBM 302 is a component of the OS Kernel. It can provide the ability to create, terminate, enumerate and control driver Sandboxes both to the rest of the OS Kernel and to user-mode through additions to the OS API.

In one aspect, while the majority of the SBM 302 implementation is in a distinct kernel subsystem (or loadable module), there can be some changes to the IO subsystem's driver-load paths to allow a device driver to be associated with a driver Sandbox. Some of these modified routines return adjusted object names to place driver objects in the Sandbox specific name-space (e.g., \Sandbox\N\Driver in this case). IopLoadDriver uses Sb analogies of the Mm APIs used to load system images (e.g., SbIsModuleLoaded, SbLoadSystemImage) to redirect the driver image load to the SBI 306.

In this environment, the driver 310 can contain some changes from original designs as well. The DriverExtension can contain a pointer to the Sandbox object. A new flag can indicate that a driver object is "isolated." In addition, the section object for an isolated driver points to a SANDBOX_LOADED_MODULE structure rather than to an actual section object. This requires a modification to ntos\mm\verifier.c to have it check the isolation flag before accessing the section object.

In the exemplary aspect, the SBM 302 allows callers to open Sandbox objects either by ID number or by name. In order to locate a particular Sandbox object by ID the SBM 302 maintains a global list of all Sandbox objects. When opening a Sandbox by name the SBM 302 simply uses the named object support in OS to perform the open operation. It will be appreciated that, a client can use the OpenSandbox API to open a particular Sandbox object. Additionally, the QueryInformationSandbox API can be employed to retrieve information about a single Sandbox object or to retrieve basic information (e.g., a list of Sandbox IDs and statuses) with regard to all of the Sandbox objects in the system. It will be appreciated that the aforementioned identification techniques can be employed in any OS environment with regard to process and/or thread objects.

Although the invention can support unnamed sandboxes (e.g., for testing purposes), Sandboxes can be particularly more useful when they have names. In operation, when the system loads a driver, it checks the "Isolation" value under the service key. If this value exists, the system looks for a Sandbox with the same name in the Sandbox directory. If it does not find one then it creates one with the specified name in that directory. Sandbox termination can occur using the TerminateSandbox API. This routine terminates the SBI 306 and waits until the SBE 304 frees all of the allocated resources. It will be appreciated that names can be assigned in a number of manners including, but not limited to, by the administrator, by the installer program, or dynamically by the OS.

With continued reference to FIG. 3, as earlier stated, the SBE 304 is the trusted side of the isolated environment and provides a "shim" between the kernel and the SBI 306. This is accomplished by providing Proxy routines for all of the entry points of an isolated device driver that are called by IO. The SBE 104 also provides for calls from the Interior 106 (e.g., Exit Points) to perform operations that act outside the isolation—for example, creating a Device Object.

Finally, the SBE 104 has the responsibility of managing resources on behalf of the interior 106 and tracking them to ensure it can release should the Sandbox terminate. For a variety of reasons explained later in this document, not all of the resources in the SBI 306 can be tracked using standard OS handles (e.g., NT-brand OS handles 204). As such, the SBE 104 maintains an additional private table of "proxy" handles 206, and owns the process of safely retrieving pointers to the associated proxy objects 208.

The SBI 306 is the un-trusted side of the isolated environment. The Sandbox innovation of the subject invention implements this as a ring-3 process started by the SBM 302 when creating a new Sandbox. It will be appreciated that the threaded interrupt handling functionality can be applied to any component isolation environment known in the art without departing from the scope of the subject invention.

The SBE 304 knows very little about the structure of the SBI 306. It can use the defined Entry Points to perform operation in the SBI 306 but does not directly manipulate Interior data. The marshalling mechanisms can be used to move complex data into and out of isolation between the interior 306 and exterior 304 halves—each half (306, 304) can translate complex data into a linear, self-relative form that the other can unpack into the appropriate format.

Likewise, the SBI 306 knows little about the structure of the SBE 304. The "tie" between the SBI 306 and the SBE 304 are the proxy handles included within the proxy handle table 312 that represent external objects or resources and their corresponding "shadow references," which represent the internal shadow of that object. These objects can support properties that (currently) correspond closely to the public members of the proxy object 314.

This abstraction leaves the SBK 308 free to provide any set of interfaces desired on top of the Exit Points. It also helps to maintain the necessary isolation between the SBI 306 and the SBE 304 as neither makes use of data structures or pointers from the other directly.

The SBK 308 provides the simulation of the device model environment to isolated drivers 310. It is also responsible for implementing the SBI 306 half of the Entry-Point mechanism—receiving requests from the SBE 304, processing them and returning the appropriate result. The subject invention structures the SBK 308 similarly to the real OS Kernel 316. It will be appreciated that the implementation is broken into similar subsystems—Ke 316, Mm 318, Io 320, Ob 322, Ex 324, etc. as illustrated. Each provides simulation of the interfaces provided by the real sub-system.

In one aspect, for performance reasons, the SBI 306 can tries to implement most device model functionality internally, using the OS services provided to any native OS application. For example, the prototype pool functions use the Nt[Allocate|Free]VirtualMemory APIs. When a fully interior implementation is not possible, the SBI 306 communicates with either the Executive 324 or the SBE 304.

Global Implementation

This section will discuss some of the core design issues involved in building the isolated environment 300. It describes how core issues can affect the design and implementation of the SBI 306 and SBE 304. Although the discussion that follows does not go into depth with regard to sections of the design that relate entirely or mostly to the SBK 308 (e.g., interrupt request level (IRQL)), these aspects will be understood by those skilled in the art.

Isolation

The exemplary aspect implements the SBI 306 using an OS (e.g., NT-brand) native process. This exemplary process models the system address space only and does not attempt to map user-address spaces into the interior. The aspect is thus limited to simulating only the subset of device model behavior that requires no direct access to the address space of the client process.

The SBI 306 process used in the example has several "special" attributes. First, it is the only process type allowed to use exit-points. Second, it couples itself to the Sandbox object very tightly—e.g., the termination of the process causes the termination of the sandbox and vice versa. The SBE 304 recognizes an SBI 306 process by checking whether the first handle (e.g., handle # 4) in its handle table 306 points to a Sandbox object that refers back to the specified process, or by checking against the Sandbox field in the EPROCESS structure of the calling process. The exit points use this check to restrict access to SBI 306 processes and then only to the interior process associated with a given Sandbox.

Kernel Simulation

Turning now to a discussion of implementing the SBK 308 such that it can simulate the operation of the device model kernel 316 accurately enough to fool device drivers 310. This includes not only the DDIs that the kernel exposes, but also any of the concepts of the runtime environment. For example, concepts including but, not limited to, IRQL, object management, thread scheduling and preemption. While they are interrelated, the DDIs and associated concepts of device model divide easily along the boundaries of the device model subsystems.

Kernel Concepts and Interfaces

The kernel subsystem is responsible for simulating certain key parts of the OS schedule behavior such as threads, dispatcher objects, IRQL, interruptions (APC, DPC and interrupts) and processor affinity. It does this through the normal OS (e.g., NT) API by making a series of simplifying assumptions about what drivers actually need from the kernel. These reduce the problem from building a full-fledged scheduler to building a system that can corral threads and force them to run an asynchronous routine as necessary.

In addition to the normal dispatcher synchronization objects and spin-locks, the subsystem can implement several new synchronization primitives designed to minimize kernel transitions and provide some of the more complex semantics that its scheduler requires.

Interior Threads

The SBK 308 uses the native support in the OS for threading, rather than implementing its own thread-scheduling scheme. On top of this, the SBK 308 simulates the missing parts of the OS API 326 (e.g., IRQL, controlling preemption, synchronization primitives) for a set of "interior threads" which are the threads used by the isolated driver 310. It is to be understood that the SBI 306 process may also employ non-interior threads running to perform actions such as waiting on the Entry Message queue or managing a debugging log file—these threads can call directly to the OS API 326 rather than going through the DDIs exposed by the SBK 308.

For each interior thread, the SBK 308 can maintain an SBTHREAD structure, which is roughly analogous to the KTHREAD structure that a Windows-brand OS maintains. The subsystem can maintain a shadow ETHREAD structure as well. This SBTHREAD can contain information the SBK 308 uses to assign threads to logical processors, the structures the thread needs in order to wait on interior synchronization objects (such as simulated events), and the structures required to make the SBTHREAD an object one can wait on.

Continuing with the example, in order to locate the current thread, the DDI function KeGetCurrentThread references a TLS slot. For example, the subsystem can allocate TLS slot #1 during initialization (no components other than the SBK 308 should be using TLS slots so the SBK 308 can use fixed numbers). The thread creation code, likewise, can store a pointer to the SBTHREAD for any internal thread it creates. Any thread that has no SBTHREAD value is not an interior thread and cannot participate in the SBK's 308 synchronization methods.

Real Locks

The "real lock" is a true spin lock, which the SBK 308 can use internally to synchronize access to data structures used at real raised IRQL. The caller is responsible for raising or lowering the real IRQL to an appropriate level before attempting to acquire a real lock. The SBK 308 uses "real locks" to synchronize access to the list of DPCs queued by ISRs between the ISR callback routine itself and the collected level thread which the SBE 304 signals to pickup and process such DPCs.

IRQLs

To most driver writers, an IRQL simultaneously encompasses the following three concepts: 1) interrupt execution priority; for a given processor, code scheduled at a higher IRQL will always interrupt code running at a lower IRQL. Furthermore, code running at a high IRQL must finish before code running at a lower IRQL can proceed; 2) code execution level equivalence; if one piece of code can interrupt another, then the interrupter will be running at a higher IRQL that the interruptee; and 3) interrupt controller state; the current IRQL reflects the current state of the processor's local interrupt controller.

IRQL Architecture

For sandboxing, common IRQL raise and lower operations (e.g., acquiring and releasing spinlocks) must execute quickly. Specifically, kernel↔user transitions are be minimized. To achieve the above goals, the sandbox features of the subject invention virtualizes both APC_LEVEL and DISPATCH_LEVEL, making them sandbox specific concepts. Virtualizing these IRQLs also allows the sandbox to rely on a wider set of Native APIs when running above PASSIVE_LEVEL in the interior. The sandbox prototype does not try to virtualize IRQLs above DISPATCH_LEVEL.

For hardware level IRQLs, the Interior must ask the Exterior to update the physical PIC, as virtualization isn't necessarily even possible. The interior can invoke the exit points to raise and lower the real IRQL for the current processor. As in kernel-mode, once an interior thread has raised IRQL above DISPATCH_LEVEL, it will continue to run on that processor until it returns to an IRQL below DISPATCH_LEVEL.

Figure 4:
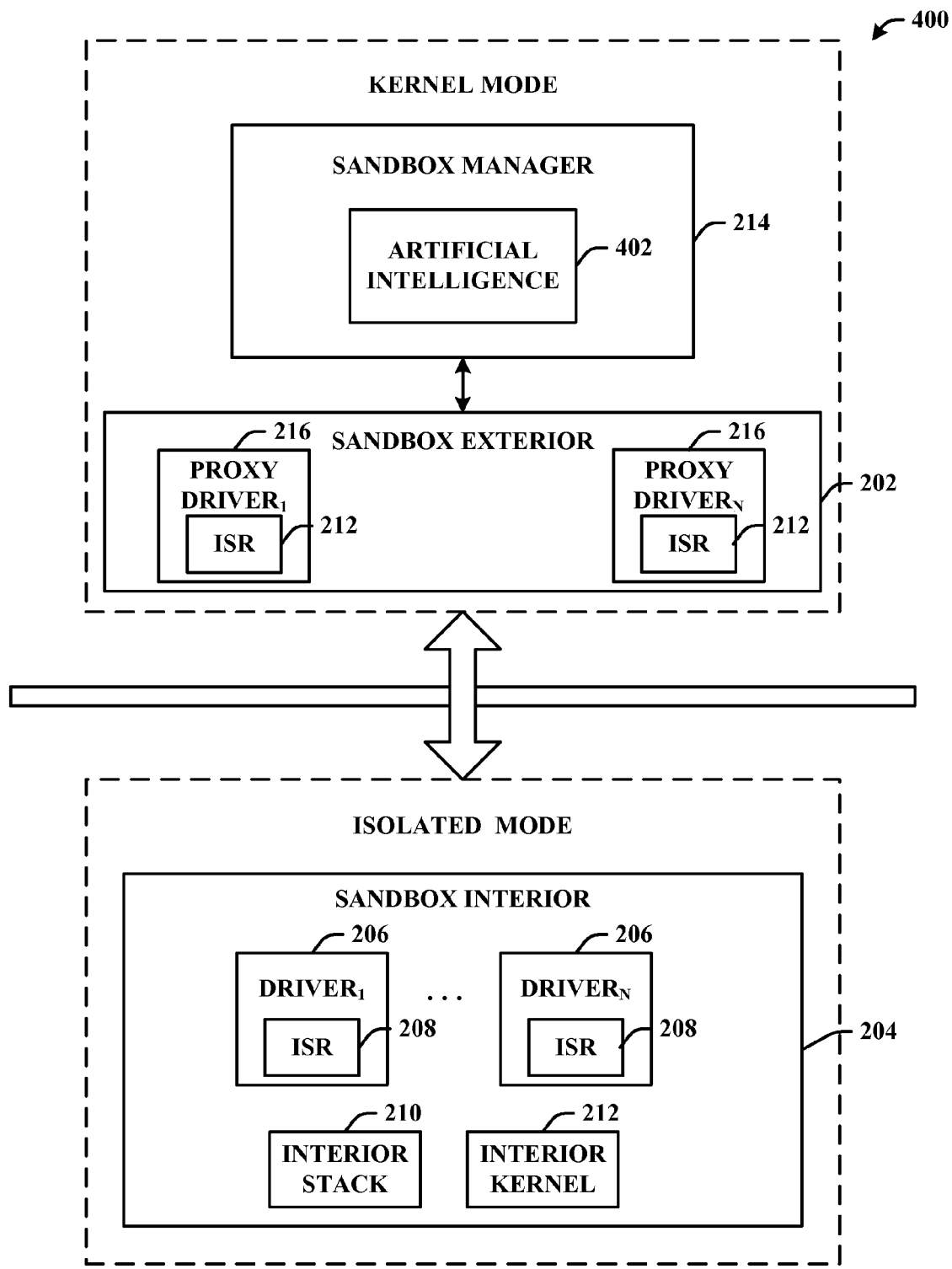
FIG. 4 illustrates a general architectural diagram that illustrates an exemplary isolation environment that employs an artificial intelligence component in accordance with an aspect of the subject invention.

Referring now to FIG. 4, an alternative architecture 400 is shown. As illustrated, architecture 400 can employ an artificial intelligence (AI) component 402 to facilitate operation of the previously described systems. By way of example, the subject invention (e.g., in connection with managing IRQL) can employ various artificial intelligence based schemes for carrying out various aspects thereof. For instance, a process for determining when the IRQL is raised or lowered can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVMs are configured via a learning or training phase within a classifier constructor and feature selection module. Thus, the classifier(s) can be used to automatically perform a number of functions, including but not limited to determining, according to a predetermined criteria when the IRQL is to be raised, when the IRQL is to be lowered, when to defer, when to lock, etc.

Figure 5A:
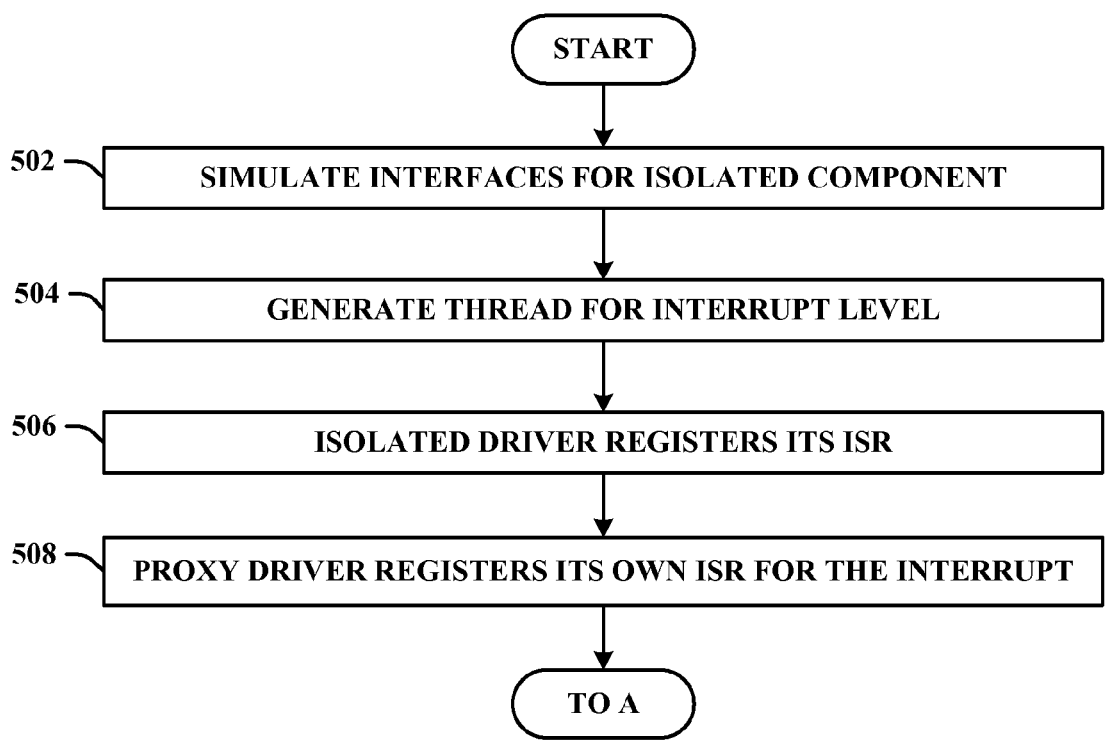
FIG. 5A illustrates an exemplary flow chart of procedures to simulate a driver in accordance with a disclosed aspect.
Figure 5B:
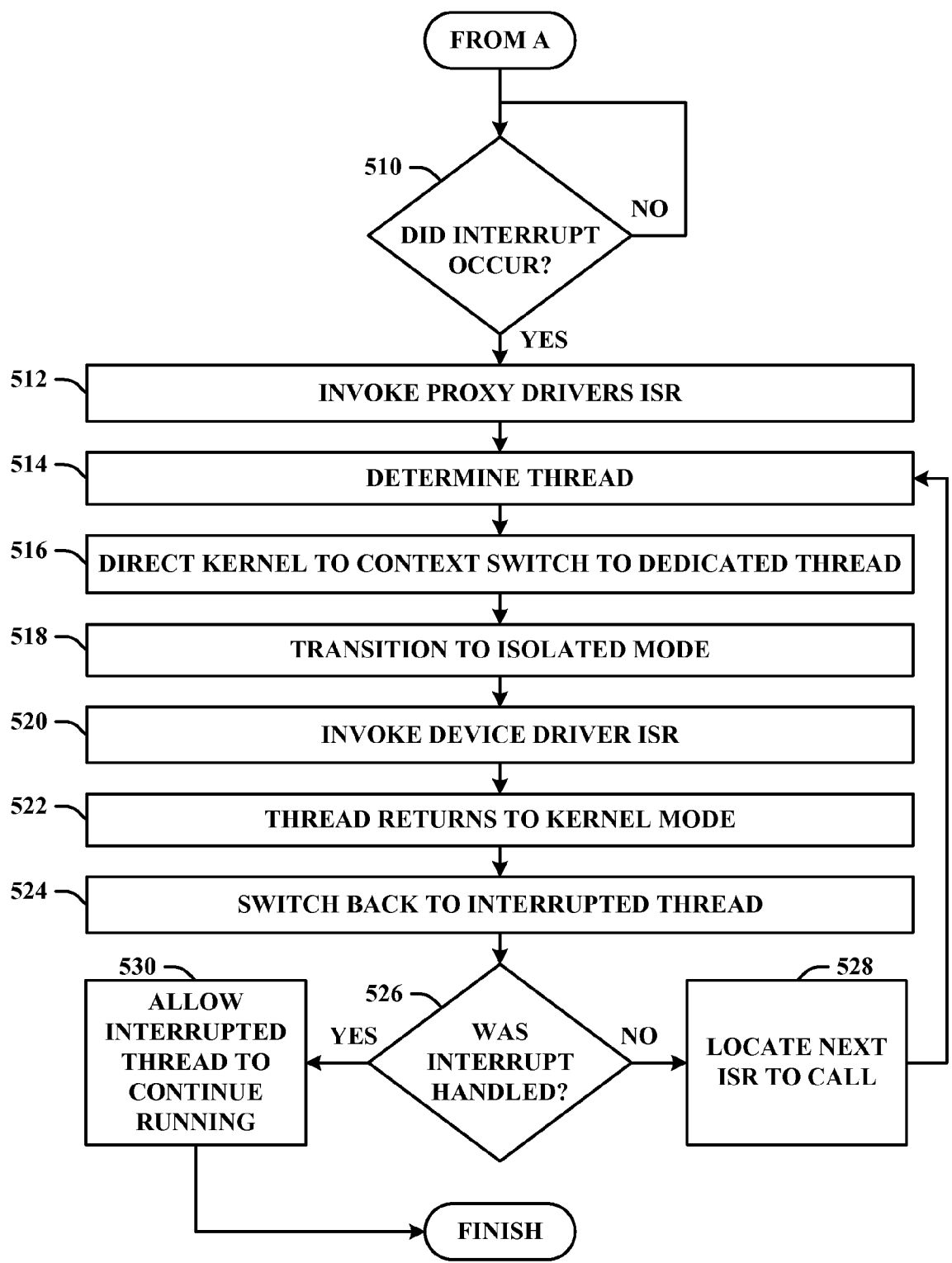
FIG. 5B illustrates an exemplary flow chart of procedures to deliver an interrupt to a driver within an isolation environment in accordance with a disclosed aspect.

With reference to FIGS. 5A and 5B, there are illustrated flowcharts in accordance to an aspect of the with the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring to FIG. 5A, as discussed in detail supra, at 502, inside the protection domain the kernel's interfaces for the isolated driver can be simulated. In accordance thereto, a thread is generated for each interrupt level (or for each connected interrupt) on each processor at 504. Accordingly, the processor can arrange with the kernel to not run unless an interrupt occurs using a new interface provided.

At 506, the isolated driver registers its ISR with the interior. It will be appreciated that this registration can be effected with the interior kernel, which causes a proxy driver running in the real kernel to register its own ISR for the interrupt at 504.

Turning now to the methodology of FIG. 5B, when an interrupt occurs at 510, the kernel invokes the proxy driver's ISR at 512. As illustrated, if an interrupt does not occur at 510, the system continues to wait for an interrupt. At 514, the ISR determines the appropriate dedicated thread by checking the interrupt and the processor it occurred on. The system then directs the kernel to context switch to the dedicated thread at 516. The dedicated thread transitions back to user-mode at 518 and, from there, invokes the device driver's ISR at 520. When the real ISR returns, the thread returns to kernel-mode at 522 where it directs the kernel to switch back to the interrupted thread at 524.

Once returned, a determination is made if the interrupt was handled at 526. More particularly, at 526, the interrupted thread determines if the interrupt was handled by a driver and, if not, locates the next ISR to call at 528. It will be appreciated that the next ISR can also be a proxy ISR. If at 526 a determination is made that the kernel interrupt handler has completed, the system allows the interrupted thread to continue running at 530.

Figure 6:
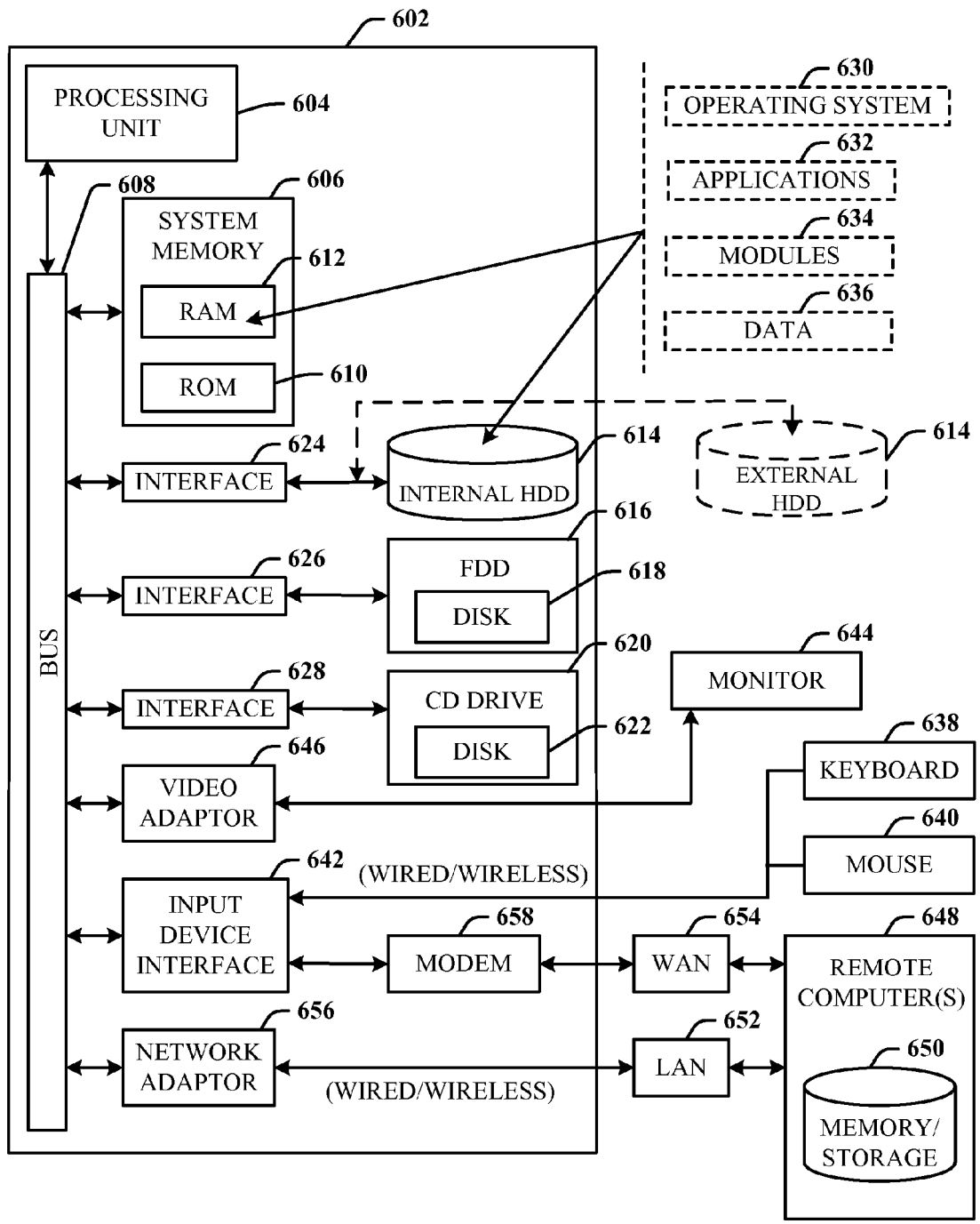
FIG. 6 illustrates a block diagram of a computer operable to execute the disclosed architecture.

Referring now to FIG. 6, there is illustrated a block diagram of a computer operable to execute the disclosed architecture. In order to provide additional context for various aspects of the subject invention, FIG. 6 and the following discussion are intended to provide a brief, general description of a suitable computing environment 600 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, there is illustrated an exemplary environment 600 for implementing various aspects of the invention that includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 612, including an operating system 630, one or more application programs 632, other program modules 634 and program data 636. All or portions of the operating system, applications, modules, and/or data can also be cached in the RAM 612. It is appreciated that the subject invention can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices, and companies, and facilitate enterprise-wide computer networks, such as intranets, all of which may connect to a global communication network, e.g., the Internet.

When used in a LAN networking environment, the computer 602 is connected to the local network 652 through a wired and/or wireless communication network interface or adapter 656. The adaptor 656 may facilitate wired or wireless communication to the LAN 652, which may also include a wireless access point disposed thereon for communicating with the wireless adaptor 656. When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 7:
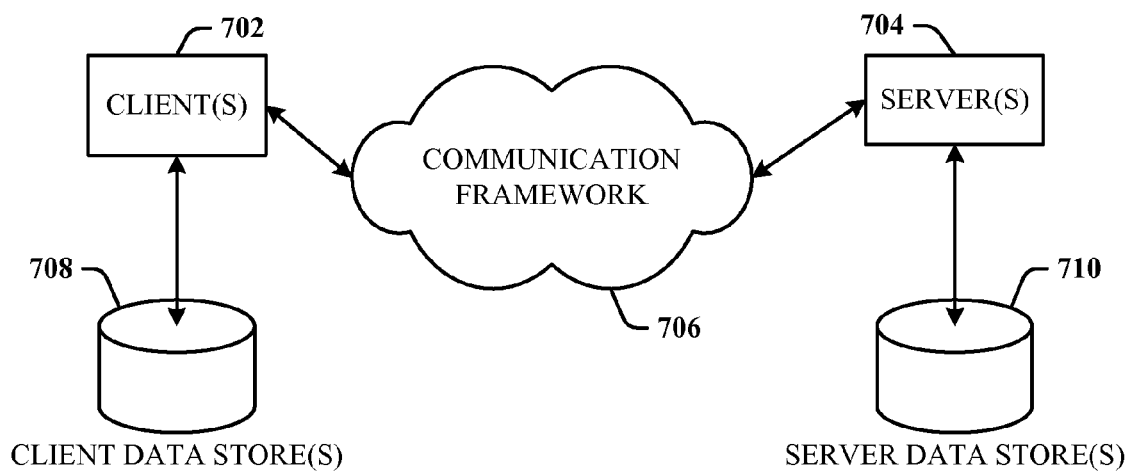
FIG. 7 illustrates a schematic block diagram of an exemplary computing environment in accordance with the subject invention.

Referring now to FIG. 7, there is illustrated a schematic block diagram of an exemplary computing environment 700 in accordance with the subject invention. The system 700 includes one or more client(s) 702. The client(s) 702 can be hardware and/or software (e.g., threads, processes, computing devices). The client(s) 702 can house cookie(s) and/or associated contextual information by employing the subject invention, for example. The system 700 also includes one or more server(s) 704. The server(s) 704 can also be hardware and/or software (e.g., threads, processes, computing devices). The servers 704 can house threads to perform transformations by employing the subject invention, for example. One possible communication between a client 702 and a server 704 can be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates invoking an isolated driver in a protection domain that is isolated from a real kernel domain upon receipt of an interrupt, the system comprising:
   a proxy driver interrupt service routine (ISR) related to a proxy driver in the real kernel domain that is associated with an isolated driver interrupt service routine (ISR) related to the isolated driver in the protection domain; and
   a component that upon receipt of an interrupt invokes the proxy driver interrupt service routine (ISR), the proxy driver interrupt service routine (ISR) directs a kernel to context switch to a dedicated execution context associated with the interrupt, the dedicated execution thread transitions to the protection domain and invokes the isolated driver.

2. The system of claim 1 the component prevents processing of more than one interrupt simultaneously on the dedicated execution context.

3. The system of claim 1, further comprising a component that simulates an interface associated to the isolated driver.

4. The system of claim 1, further comprising an artificial intelligence component that automatically infers the priority level based upon the interrupt.

5. The system of claim 4, further comprising an interrupt controller that maintains a hierarchy of levels of interrupts.

6. The system of claim 5, the interrupt controller is programmed to processes interrupts only above a set threshold interrupt level.

7. A system for invoking an isolated driver in an environment that is isolated from a kernel environment upon receipt of an interrupt, the system comprising:
   a sandbox management component that creates one or more isolated environments that are isolated from the kernel environment;
   a sandbox exterior component located out outside of the isolated environment that invokes an isolated driver within the isolated environment upon receipt of an interrupt through a proxy handle associated with the isolated driver, the sandbox exterior component is isolated from the interior of the isolated environment.

8. The system of claim 7, further comprising a sandbox interior component located within the isolated environment that provides an entry point mechanism to the interior of the isolated environment;

9. The system of clam 8, the sandbox exterior component provides an entry point into the isolated environment from the exterior of the isolated environment through proxy handles associated with the sandbox interior component.

10. The system of claim 9, the sandbox exterior component and sandbox interior component do not share date structures or pointers directly.

11. The system of claim 8, the sandbox interior component and sandbox exterior component provide exit points from the isolated environment.

12. The system of claim 8, wherein termination of the sandbox interior component causes termination of the isolated environment.

13. The system of claim 7, further comprising an interior kernel within the isolated environment that simulates the kernel environment for isolated drivers.

14. A method for invoking an isolated driver in an environment isolated from a kernel environment upon receipt of an interrupt, the method comprising:
   invoking a proxy ISR associated with the interrupt in the kernel environment, the proxy ISR is isolated from the isolated environment and is related to an isolated driver ISR located within the isolated environment, the isolated driver ISR is associated with the isolated driver;
   transitioning to a user mode within the isolated environment; and
   invoking the isolated driver ISR.

15. The method of claim 14, further comprising automatically determining a priority level as based upon the interrupt message.

16. The method of claim 14, further comprising registering the isolated driver ISR.

17. The method of claim 14, further comprising registering the proxy ISR associated to the interrupt message.

18. The method of claim 14, further comprising simulating the kernel environment within the isolated environment for the isolated driver.

19. The method of claim 14, further comprising transitioning to the kernel environment and determining of the interrupt was handled.

20. The method of claim 14, further comprising terminating the isolated environment and cleaning up memory if the isolated driver operated improperly.

* * * * *